United States Patent [19]

Fisher

[11] 4,401,128
[45] Aug. 30, 1983

[54] GRAIN LOSS REDUCTION KIT

[76] Inventor: Hollis G. Fisher, Rte. 2, Box 233, Mulberry, Ark. 72947

[21] Appl. No.: 314,759

[22] Filed: Oct. 26, 1981

[51] Int. Cl.$^3$ ............................................. A01F 12/00
[52] U.S. Cl. ................................. 130/27 R; 130/27 J; 130/26
[58] Field of Search .............. 130/24, 25, 27 R, 27 H, 130/27 HF, 27 N, 27 Z, 27 J, 27 L, DIG. 5, DIG. 6, 26

[56] References Cited

U.S. PATENT DOCUMENTS

| | | | |
|---|---|---|---|
| 1,864,033 | 6/1932 | Wettlaufer | 130/27 E |
| 3,583,405 | 6/1971 | Gerhardt | 130/27 R |
| 3,963,032 | 6/1976 | Rüede | 130/24 |
| 4,303,079 | 12/1981 | Claas et al. | 130/27 Z |

Primary Examiner—Gene Mancene
Assistant Examiner—David Tarnoff
Attorney, Agent, or Firm—Stephen D. Carver

[57] ABSTRACT

A grain conserving kit for combines. The invention includes a rigid, notched transfer plate which is interposed between a combine cylinder thresher and the straw walkers in replacement of the conventional fingers assembly. The reduced width finger replacement plate is located below the beater above the concave, and it allows an abundance of grain and fine chaff to fall off the rearward end thereof as the straw walkers oscillate. The plate cooperates with a vertically oriented, rigid baffle to establish a drop chute. Air confiner apparatus is adapted to be coupled about the combine grain cleaning structure and the straw walkers. The confiner apparatus redistributes air flow from the conventional air blower acting upon the combine sieve structure during the final grain cleaning process. By confining air flow, unwanted material accumulation upon the downhill side of the apparatus when operating at an incline is avoided. Additionally, proper air distribution prevents grain from being blown out with the chaff.

2 Claims, 8 Drawing Figures

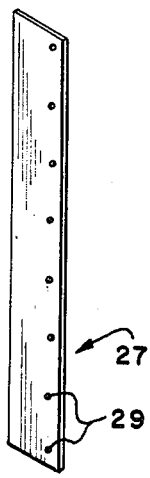
FIG.4
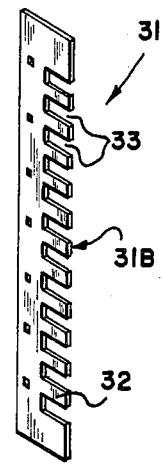
FIG.5
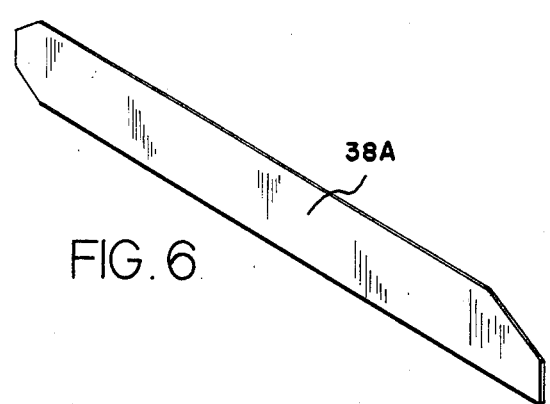
FIG.6
FIG.7
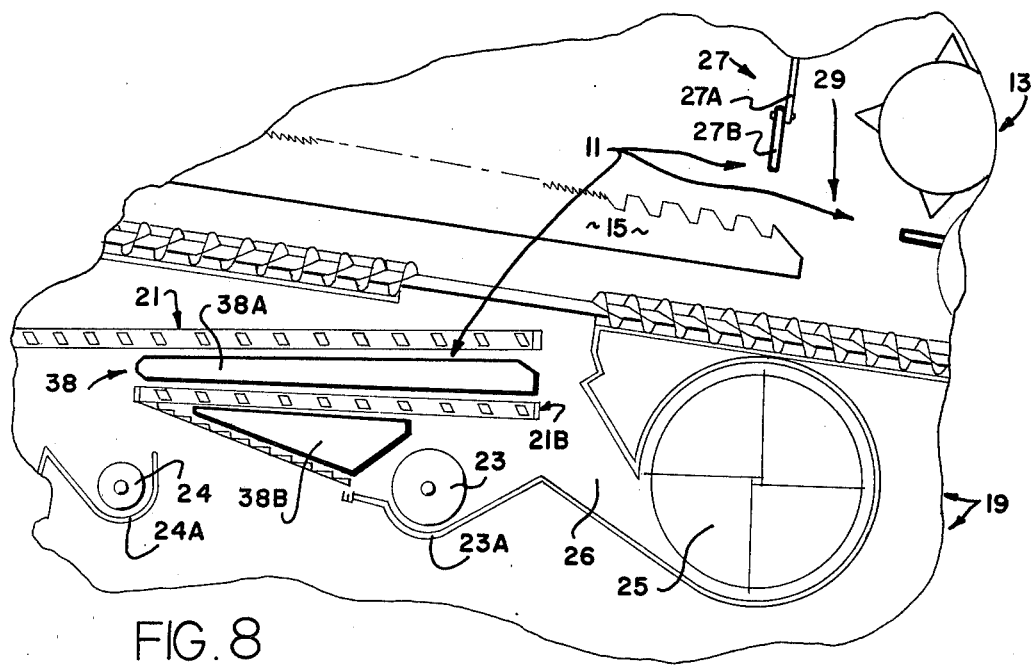
FIG.8

GRAIN LOSS REDUCTION KIT

BACKGROUND OF THE INVENTION

This invention relates to the field of combine harvesters. More particularly the present invention relates to a three piece combination of replacement items for greatly improving the operation of conventional combines.

The current state of the art for combine harvesters, as known by the applicant, is excellently presented in 39-Page John Deere advertising brochure entitled "Rice and Soybean Combines", published by Deere and Company, Moline, Ill. Additionally, the present state of the art is depicted in FIG. 1 of applicant's drawings. Accordingly, it may readily be seen that the structure depended upon heretofore to transfer the straw and/or residue from the cylinder-concave thresher onto the straw walkers consists of an array of parallel, spaced-apart, overly long "fingers" which extend rearwardly beyond the most forward portion of the straw walkers, i.e., even when the straw walkers are at their most rearward point of travel.

A particular problem exists with present combines in that too much fine chaff is being carried by the straw walkers. This results in sealing the grain over, which prevents it from separating from the chaff. Thus grain is ultimately lost when carried on out and discharged from the combine with the straw. The intent of the spacings between the array of fingers is to enable grain to gravitate therethrough; however, in actual practice, this does not reliably occur.

Another problem encountered with present-day combine harvesters involves the grain cleaning section which includes an air blower and sieve structure. This latter problem results from an inadequate distribution of the volume of air emanating from the air blower subsection. The air flow from the air blower is intended to accomplish two distinct purposes. First, a portion of the air is directed to the straw walkers which lifts and separates the fibers, thus facilitating the separation of residual grain therefrom. Second, a volume of air is directed toward the sieve structure to entrain the chaff and/or unthreshed material (known in the art as tailings) from the remainder of the material received in the cleaning section. Applicant has found that in present combines too much air is being directed toward the sieve structure. Thus a considerable amount of grain is now being inadvertently blown out with the tailings, obviously resulting in undesireable waste.

Another problem is encountered when harvesting certain types of grain and/or under certain damp climatic conditions. This latter problem is directly associated with the above mentioned finger array in that the fingers have a tendency to hold up the flow of certain types of straw, e.g., green straw, bean sticks, weeds, corn and milo maize. This slowing down or stopppage of the material at this location in the combine prevents the expected separation of the grain from the straw. Indeed, applicant has found that in certain combines this problem will become so severe that the beater belts often are broken as a result thereof. Obviously, the down time of the equipment, coupled with the man hours required to accomplish the repair, becomes a source of aggravation to the farmer.

The state of the art as known by applicant includes the following U.S. Pat. Nos. 1,034,469; 1,962,541; 2,189,706; 2,247,446; 2,305,964; 2,457,680; 2,682,951; 2,686,523; 2,739,597; 2,718,967; 2,812,766; 2,939,581; 3,109,433; 3,583,405; 3,603,063; 3,848,609; 2,440,197; and 2,262,453. However the combination of elements as taught by applicant have not previously been suggested.

SUMMARY OF THE INVENTION

The present invention comprises a combination of pieces in kit form for overcoming the disadvantages and problems relative to previous combine harvesters. Indeed, the present invention has been shown to greatly reduce the amounts of conventional grain loss. For example with the present modifications, approximately fifty to eighty percent (50%-80%) less grain will be wasted.

The concept of the present invention is to provide structure which purposely diverts an abundance of the fine chaff directly from the cylinder-concave thresher to the grain/tailing conveyor, i.e., bypassing the straw walkers. The present invention includes control structure for properly confining the air mass generated by the air blower unit of the combine grain cleaner section so that the grain separation process of the straw walkers is enhanced, while the likelihood of grain becoming airborne with the chaff in the cleaning process is greatly reduced.

This invention includes a rigid slotted transfer plate which replaces the conventional array of unreliable fingers interposed between the cylinder concave and the straw walkers. The transfer plate is conspicuously short, hence a drop slot periodically is established between the thresher and the straw walkers. In other words, the short slotted replacement plate allows an abundance of grain and fine chaff to fall off the rearward end thereof as the straw walkers oscillate, i.e., bypassing the straw walkers completely. By diverting this abundance of co-mingled grain and chaff, the likelihood of the straw walkers having too much fine chaff thereon is obviated. Heretofore too much chaff on the straw walkers caused the grain to seal over and not separate from the chaff which, of course, contributed to the grain waste. The plate cooperates with a resilient vertical baffle adapted to be mounted between it and the straw walker. This baffle or curtain also prevents grain from being thrown back too far by the beater. The curtain must be rather heavy, and is preferably made of ten (10) or twelve (12) gauge sheet steel.

The transfer plate also obviates another problem associated with the array of fingers. The fingers are the source of a problem often experienced under varying threshing conditions and/or climatic conditions in that the fingers have a tendency to hold up the flow of some types of straw, e.g., green straw, bean sticks, weeds, corn, and milo-maize. This slows down or stops up the material moving from the thresher section and interferes with grain separation. In some combines the latter problem is so intense that the loading up at this point is sufficient to cause beater belts to break. Replacement of the fingers with the transfer plate of the present invention completely obviates this problem.

The present invention solves other problems associated with the grain cleaner section of the typical combine. One prior art problem is a result of an inadequate air distribution of the air mass emanating from the air blower unit of the grain cleaner section. This feature of the present invention involves fixedly securing air volume confining or channel members around the grain cleaner section. This aids in keeping the sieves unclogged. Since an optimum portion of the air mass is now being diverted through the sieves, the air splitter curtails the overwhelming effectiveness of the air blower's actions upon the sieve structure. Heretofore, kernels of grain have become airborne with the chaff and were inadvertently discharged therewith. Thus entrained grain was blown out with the tailings.

For example, when operating on terraces the combine is inclined, and as a result the pressurized air, which seeks a path of least resistance, does not effectively move grain which accumulates on the downhill side of the apparatus. The confining mechanism of the present invention redistributes the air pathway to balance air pressure through the sieves. This prevents gravity caused material accumulation otherwise experienced when operating on machines.

The air confiner system is disposed immediately around the sieves and confinement causes an optimum amount of air to now be diverted to flow up through the sieves. This enhances the separation of the grain from the chaff as the straw moves through the straw walkers. Thus, the loss of grain that has heretofore been carried out with the straw is greatly curtailed. Also, the grain does not readily become airborne in the sieve section which, of course, results in avoiding the loss of this grain. Further, the slotted transfer plate disposed behind the thresher section enables more of the fine chaff to fall below the straw walkers or by-pass the straw walkers, thus giving them a better chance to separate the grain from the straw and chaff. Therefore, the problem heretofore associated with the breaking of the beater belts is obviated.

BREIF DESCRIPTION OF THE DRAWINGS

In the following drawings, which form a part of the specification and which are to be construed in conjunction therewith, and in which like reference numerals have been employed throughout to indicate like parts in the various views:

FIG. 4 is an enlarged isometric view of the rigid baffle curtain replacement panel;

FIG. 5 is an enlarged isometric view showing the slotted, finger replacement transfer plate;

FIG. 6 is a side elevational view of a preferred air enclosure panel;

FIG. 7 is a side elevational view of a cooperating air enclosure panel; and,

FIG. 8 is a diagrammatic view illustrating the desired installed positions of typical parts in the present kit upon a combine.

DESCRIPTION OF THE PREFERRED EMBODIMENT

Figure 1:
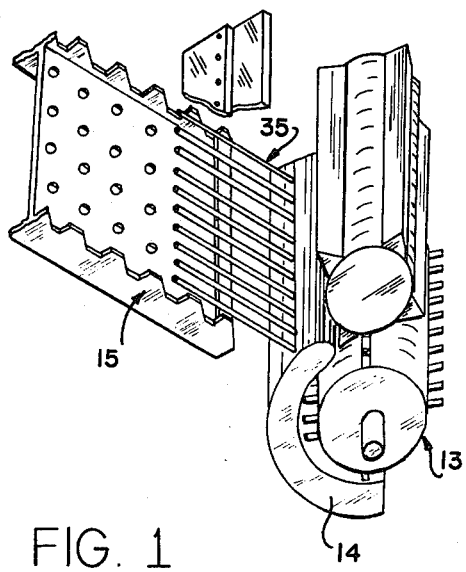
FIG. 1 is a perspective view illustrating prior art, which view depicts an array of parallel, spaced-apart fingers interposed between a cylinder-concave thresher and a straw walker.
Figure 2:
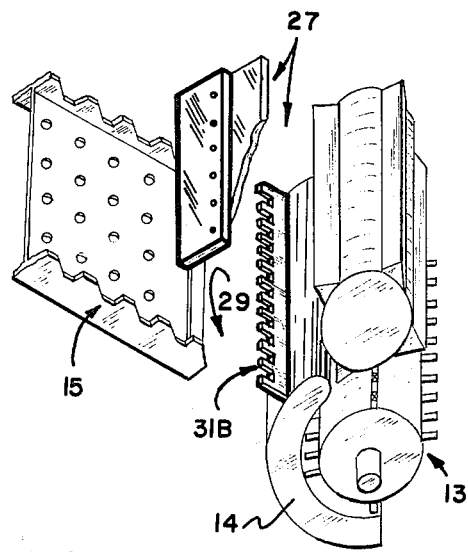
FIG. 2 is a perspective view similar to FIG. 1 illustrating the transfer plate and baffle curtain of the present invention operatively replacing the prior art fingers, with parts thereof broken away for clarity.
Figure 3:
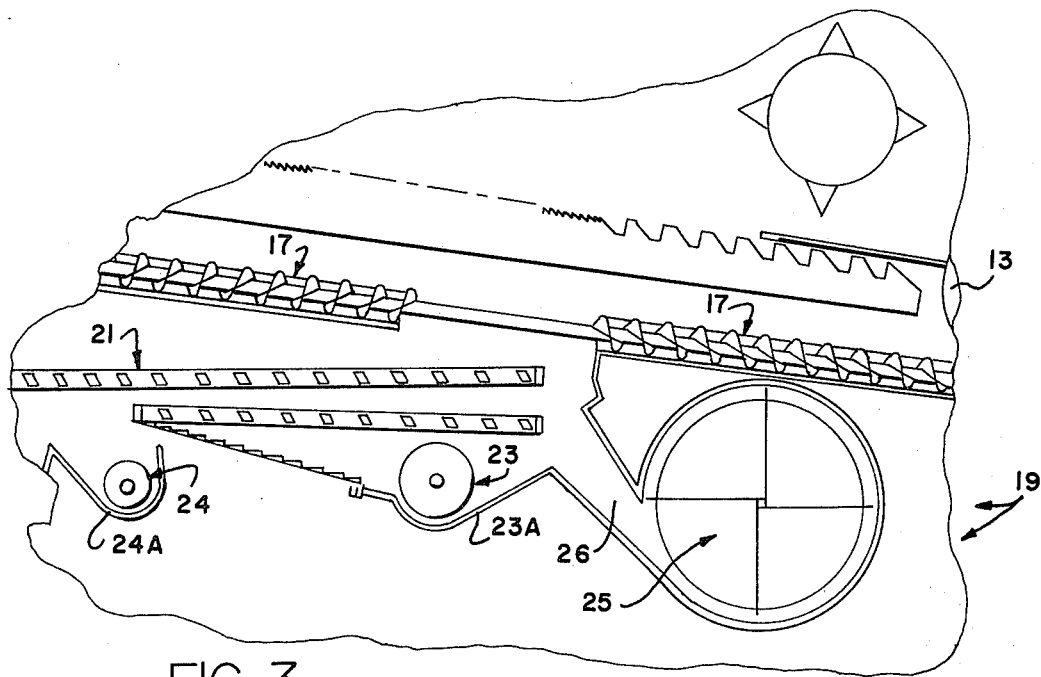
FIG. 3 is a side elevational view taken on a vertical cut of a typical combine or prior art and which also depicts the typical grain cleaning section; also, the straw walker is depicted in its forwardmost position.

The concept of the present invention may readily be incorporated with many different well known name brand and model combine harvesters. Many late model John Deere combines serve as typical examples of the environment upon which the members of the present invention, are most desireably installed. Additionally, the prior art features as depicted in FIG. 1 of the drawings are characteristic of the above-mentioned John Deere combines.

The combination 11 of the present invention is intended to be used in conjunction with typical combine harvesters of the above-mentioned type which invariably have a cylinder-concave thresher means characterized generally herein by reference numeral 13. Cylinder 13 establishes an initial stage for separating grain from the straw and chaff. Typical combines also include apertured, plate-like straw walker means generally designated by the reference numeral 15 which establish a subsequent stage for further separating grain from the straw and chaff. Grain/tailings or auger means is generally designated by the reference numeral 17. The latter is generally disposed beneath the thresher means 13, and reaches beneath the straw walker means 15 for receiving the partially segregated grain as it gravitates from the cylinder thresher means 13 and the straw walker means 15. Thresher 13 is disposed over concave 14.

Additionally, the typical combine harvester usually includes grain cleaning means generally designated by the reference numeral 19. It may readily be seen that the grain cleaning means 19 is disposed adjacent or beneath the grain/tailings conveyor means 17 for receiving the grain and tailings directly therefrom, and for establishing a final stage for removing substantially all of the unthreshed material from the grain. The unthreshed material is commonly referred to as "tailings". The typical grain cleaning means 19 includes sieve means, generally designated by the reference numeral 21, for readily passing only the cleaned grain onto clean grain conveyor augers 23, 24. The latter augers convey grain along trays 23A or 24A. Conventional air blower 25 directs a moving mass of air toward the sieve means 21 outwardly through passageway 26, thereby establishing moving air mass which entrainingly conveys the unthreshed material or tailings to a tailings discharge station (not shown) in a manner well known to those skilled in the art.

The invention 11 includes means, generally designated by the reference numeral 27, for periodically establishing a drop slot, as at 29, through which the fine chaff and grain may readily garvitate immediately onto the lower grain/tailing conveyor means 17. Drop slot 29 is disposed between the cylinder thresher means 13 and the straw walker means 15 to enable an abundance of the residue of comingled chaff and grain being rejected by the cylinder thresher means 13 to immediately enter into the grain/tailings conveyor means 17. Accordingly, the straw walker means 15 does not become clogged with the fine chaff. Hence, the straw walker means is free to act chiefly upon the straw thus enhancing the effectiveness of the straw walker means, i.e., greatly reducing the amount of grain heretofore lost or carried outwardly with the straw.

Means 27 for periodically establishing the drop slot 29 includes slotted transfer plate means 31 situated between the cylinder thresher means 13 and the straw walker means 15 for cooperative action with the straw walker means 15. The transfer plate means 31 includes a slotted rearward edge, 31B, including rigid flat portions 32 disposed between slots 33 (FIG. 5). The straw walker means 15 is caused to shakingly oscillate a given distance toward and away from the rearward edge 31B of the transfer plate means 31. The drop slot 29 is completely eliminated alternately as the walker 15 moves to its forwardmost position.

From FIG. 1 of the drawings it may be seen that the prior art included an array of fingers, as at 35, which have sufficient length thereto so as to constantly overlap straw walker 15. It can readily be appreciated by those skilled in the art that the prior combines did not offer a means of immediately passing an abundance of the fine chaff onto the straw walkers 15. The spacing between adjacent ones of the array of fingers 35 does not permit an abundance of the chaff and grain to pass therethrough. Indeed, the array of fingers 35 is certain threshing conditions have a tendency to hold up the flow of some types of straw, e.g., green straw, bean sticks, weeds, corn, and milo-maize. This slow-down or stoppage of the material at this stage in the combine is most detrimental in the operation thereof. Indeed, some machines will at times load up sufficiently to cause the beater belts (not shown) to break. This condition is well known to those skilled in the art and actual field condition testing and evaluation of the apparatus 11 has proved successful in substantially eliminating the breakage of the beater belts. Additionally, the field testing of the apparatus 11 has shown that the grain loss over the straw walkers 15 has been reduced from 50 to 85%.

The rigid, planar curtain 27B is coupled to conventional support plate 27A to replace the prior art resilient baffle member (now shown). Mounting holes 29B are provided for attachment purposes. Curtain 27B should be made of heavy gauge steel.

Thus, depending upon the position of walker 15, apparatus 27 functions as a "backboard" to encourage direction of materials down slot 29.

Apparatus 11 also includes air confinement plate means, generally designated by the reference numeral 38. Plate 38A (FIG. 6) is disposed between sieves 21, 21B. Lower "triangular" side plate 38B (FIGS. 7,8) is nominally positioned slightly to the rear of auger 23 below sieve 21B. Air emanating from the blower means 25 out the chute 26 is thus restrained from laterally exiting around gaps between sieves 21B, 21 etc.

Thus, it will be appreciated by those skilled in the art that the likelihood of grain kernels becoming entrained with the air mass is greatly diminished, i.e., further contributing to the minimizing of grain loss. Additionally, it will also be appreciated that the plates 38A and 38B simultaneously increase the volume of air being channeled through the sieves for enhancing the grain separation effectiveness. The increased air volume is evenly distributed between the confiner plates. Therefore, build-up of material on the downhill side of air inclined combine is prevented.

As previously mentioned, the straw walker means 15 oscillates a given distance toward and away from the cylinder thresher means 13. Moreover, it may readily be appreciated by those skilled in the art that the transfer plate means 31 has a predetermined size commensurate with the given distance of the oscillations of the straw walker means 15. Therefore, the plate means 31 alternately establishes, at least in part, the previously mentioned drop slot 29 through which the fine chaff and grain may readily gravitate onto the grain/tailings conveyor means 17. More specifically, typical dimensions for fore and afte movement of the straw walker means 15 would be nominal 12 inches. Additionally, when the straw walker means is in its forwardmost position, the overlapping arrangement of the transfer plate means 31 and the straw walker means 15 would preferably be just a few inches or certainly less than 6 inches.

From the above disclosure it may now readily be seen that the size of the drop slot 29 is sufficient to allow an abundance of the chaff and grain to readily gravitate or periodically pass therethrough, i.e., as the straw walker means 15 oscillates to and fro. Additionally, it will be appreciated by those skilled in the art that the straw does not have a tendency to pass through the drop slot 29 since it is more entangled into a mass and the momentum of the mass of straw at this point is such that it is carried onto the straw walker means 15 in substantially the same manner as heretofore when using the array of fingers 35.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A grain saving kit adapted to be installed upon a combine harvester of the type having cylinder thresher means establishing an initial stage for partially segregating grain from the straw and chaff, oscillating straw walker means establishing a subsequent stage for further separating grain from the straw and chaff, grain/tailings conveyor means disposed adjacent said cylinder thresher means and said straw walker means for receiving the partially segregated grain as it leaves said clyinder thresher means and said walker means, grain cleaning means disposed adjacent said grain/tailings conveyor means for receiving the grain and tailings therefrom and to establish a final stage for removing substantially all of the unthreshed material from the grain, said grain cleaning means having sieve means for readily passing only the clean grain onto clean grain conveyor means, and air blower means directed toward said sieve means for primarily establishing a moving air mass which entrainingly conveys the unthreshed material to a tailings discharge section, the kit comprising:

means for periodically establishing a drop slot through which the fine chaff and grain may readily gravitate onto said grain/tailings conveyor means, said drop slot being disposed between said cylinder thresher means and said straw walker means to enable an abundance of the residue of comingled chaff and grain rejected by said cylinder thresher means to immediately enter onto said grain/tailings conveyor means; said means for periodically establishing a drop slot comprising:

transfer plate means situated between said cylinder thresher means and said straw walker means for cooperative action with said straw walker means, said transfer plate means having a slotted rearward edge for encouraging separation of grain from chaff, the transfer plate defining at least in part said drop slot as said straw walker means is caused to shakingly oscillate a given distance toward and away from said rearward edge of said transfer plate means; and, rigid, planar baffle plate means disposed generally vertically above said drop slot; and, air confinement means interposed adjacent said grain cleaning means and said conveyor means for insuring even distribution of the air mass as it moves in the immediate vicinity of said sieve means, whereby to attenuate the likelihood of grain kernels inadvertently becoming entrained along with the unthreshed material, and for compensating for material build-up otherwise occuring on inclined surfaces, thus enhancing the grain separation effectiveness of said straw walker means and the grain distribution said combine.

2. The combination as defined in claim 2 in which said transfer plate means has a predetermined size commensurate with the given distance of the oscillations of said straw walker means for alternately establishing at least in part said drop slot through which the fine chaff and grain may readily gravitate onto said grain/tailings conveyor means.

* * * * *